(12) United States Patent
Tu et al.

(10) Patent No.: US 11,310,835 B2
(45) Date of Patent: Apr. 19, 2022

(54) RESOURCE ALLOCATION METHOD AND RESOURCE ALLOCATION SYSTEM WITH LOW HARDWARE COMPLEXITY

(71) Applicant: Realtek Semiconductor Corp., HsinChu (TW)

(72) Inventors: Hsiu-Ming Tu, Hsinchu County (TW); Han-Sheng Liu, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 191 days.

(21) Appl. No.: 16/831,779

(22) Filed: Mar. 26, 2020

(65) Prior Publication Data
US 2021/0120589 A1    Apr. 22, 2021

(30) Foreign Application Priority Data
Oct. 16, 2019    (TW) .................................. 108137187

(51) Int. Cl.
| | | |
|---|---|---|
| *H04W 74/08* | (2009.01) | |
| *H04W 72/04* | (2009.01) | |
| *H04W 74/00* | (2009.01) | |
| *H04W 28/26* | (2009.01) | |

(52) U.S. Cl.
CPC ....... *H04W 74/0833* (2013.01); *H04W 28/26* (2013.01); *H04W 72/0446* (2013.01); *H04W 74/006* (2013.01); *H04W 74/0816* (2013.01)

(58) Field of Classification Search
CPC . H04W 74/0833; H04W 28/26; H04W 28/04; H04W 74/006; H04L 5/0055
See application file for complete search history.

(56) References Cited

U.S. PATENT DOCUMENTS

| | | | | |
|---|---|---|---|---|
| 10,932,295 | B2 * | 2/2021 | Ko | ........................ H04W 28/04 |
| 2016/0278112 | A1 * | 9/2016 | Liu | ........................ H04W 8/005 |
| 2018/0077735 | A1 * | 3/2018 | Ahn | .................. H04W 74/0833 |
| 2019/0159245 | A1 | 5/2019 | Park | |
| 2021/0120589 | A1 * | 4/2021 | Tu | ..................... H04W 74/0816 |

OTHER PUBLICATIONS

"IEEE P802.11ax™/D4.0" (p. 342-p. 347), Feb. 2019.

* cited by examiner

*Primary Examiner* — Raj Jain
(74) *Attorney, Agent, or Firm* — Winston Hsu (57) ABSTRACT

A resource allocation method includes the following steps: receiving a trigger frame signal, analyzing the trigger frame signal for acquiring at least one first user information field, determining at least one first random access resource unit number according to the at least one first user information field, decreasing a countdown parameter to generate a first countdown result according to the at least one first random access resource unit number, determining whether to continuously receive the trigger frame signal according to the first countdown result, and selecting a first random access resource unit from multiple random access resource units of the at least one first user information field when the trigger frame signal is not continuously received.

15 Claims, 10 Drawing Sheets

RESOURCE ALLOCATION METHOD AND RESOURCE ALLOCATION SYSTEM WITH LOW HARDWARE COMPLEXITY

BACKGROUND OF THE INVENTION

1. Field of the Invention

The present disclosure relates to a resource allocation method and a resource allocation system, and more particularly, a resource allocation method and a resource allocation system with low hardware complexity and high operating performance.

2. Description of the Prior Art

With the rapid developments of technologies, various short-range and long-range communication standards have been applied in our daily life. For example, a Wi-Fi 6 protocol supporting a High-Efficiency Wireless (HEW) standard is categorized as an IEEE 802.11ax standard. The IEEE 802.11ax standard is developed for solving wireless link problems of high-density networks and can improve traffic performance of the networks. Specifically, a transmission rate of the Wi-Fi 6 communication based on the IEEE 802.11ax standard can be enhanced to approach several times greater than transmission rate of the communication based on the IEEE 802.11ac standard (a previous standard version). Further, the Wi-Fi 6 communication based on the IEEE 802.11ax standard can perform multi-user accessing communication. In the IEEE 802.11ax standard, multiple access points can communicate with multiple communication terminals by using orthogonal frequency division multiple access (OFDMA) technologies or multi-user multiple input multiple output (MU-MIMO) technologies. Further, communication systems for the IEEE 802.11ax standard can provide robust and reliable signal transmission quality. Even if a received signal strength indication (RSSI) is reduced, a performance of signal communications can be maintained, thereby leading to satisfactory quality of service (QoS). Further, since a target wake time (TWT) mechanism is introduced to the IEEE 802.11ax standard, the communication systems can optimize allocations of scheduling resources, resulting in extension of working time.

Currently, according to the Wi-Fi 6 communications based on the IEEE 802.11ax standard, the access point can be used for allocating resources of all communication terminals by using a uniform random selection process, or the access point can be used for allocating a part (subset) of resources of all communication terminals. However, hardware of a current access point and communication terminal cannot support resource allocations in real-time. Therefore, when the access point continuously releases frequency band information used for allocating resources, the communication terminal requires additional memory space for temporarily buffering and analyzing information of all resources. Thus, for the Wi-Fi 6 communications based on the IEEE 802.11ax standard, it is hard to perform the resource allocations in real-time. Further, since additional memory space is introduced, it results in an increment of cost.

SUMMARY OF THE INVENTION

In an embodiment of the present disclosure, a resource allocation method is provided. The resource allocation method includes the following steps: receiving a trigger frame signal, analyzing the trigger frame signal for acquiring at least one first user information field, determining at least one first random access resource unit number according to the at least one first user information field, decreasing a countdown parameter to generate a first countdown result according to the at least one first random access resource unit number, determining whether to continuously receive the trigger frame signal according to the first countdown result, and selecting a first random access resource unit from multiple random access resource units of the at least one first user information field when the trigger frame signal is not continuously received.

In another embodiment of the present disclosure, a resource allocation system is provided. The resource allocation system includes an access point and at least one communication terminal. The access point is configured to generate a trigger frame signal. Each communication terminal includes a transceiver, a processor, and a memory. The transceiver is configured to receive the trigger frame signal. The processor is coupled to the transceiver and configured to analyze the trigger frame signal. The memory is coupled to the processor. After the trigger frame signal is analyzed by the processor, the processor acquires at least one first user information field, controls the memory to buffer data of one user information field, determines at least one first random access resource unit number according to the at least one first user information field, and decreases a countdown parameter to generate a first countdown result according to the at least one first random access resource unit number. Further, the processor determines whether to continuously receive the trigger frame signal according to the first countdown result, and selects a first random access resource unit from multiple random access resource units of the at least one first user information field when the trigger frame signal is not continuously received.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
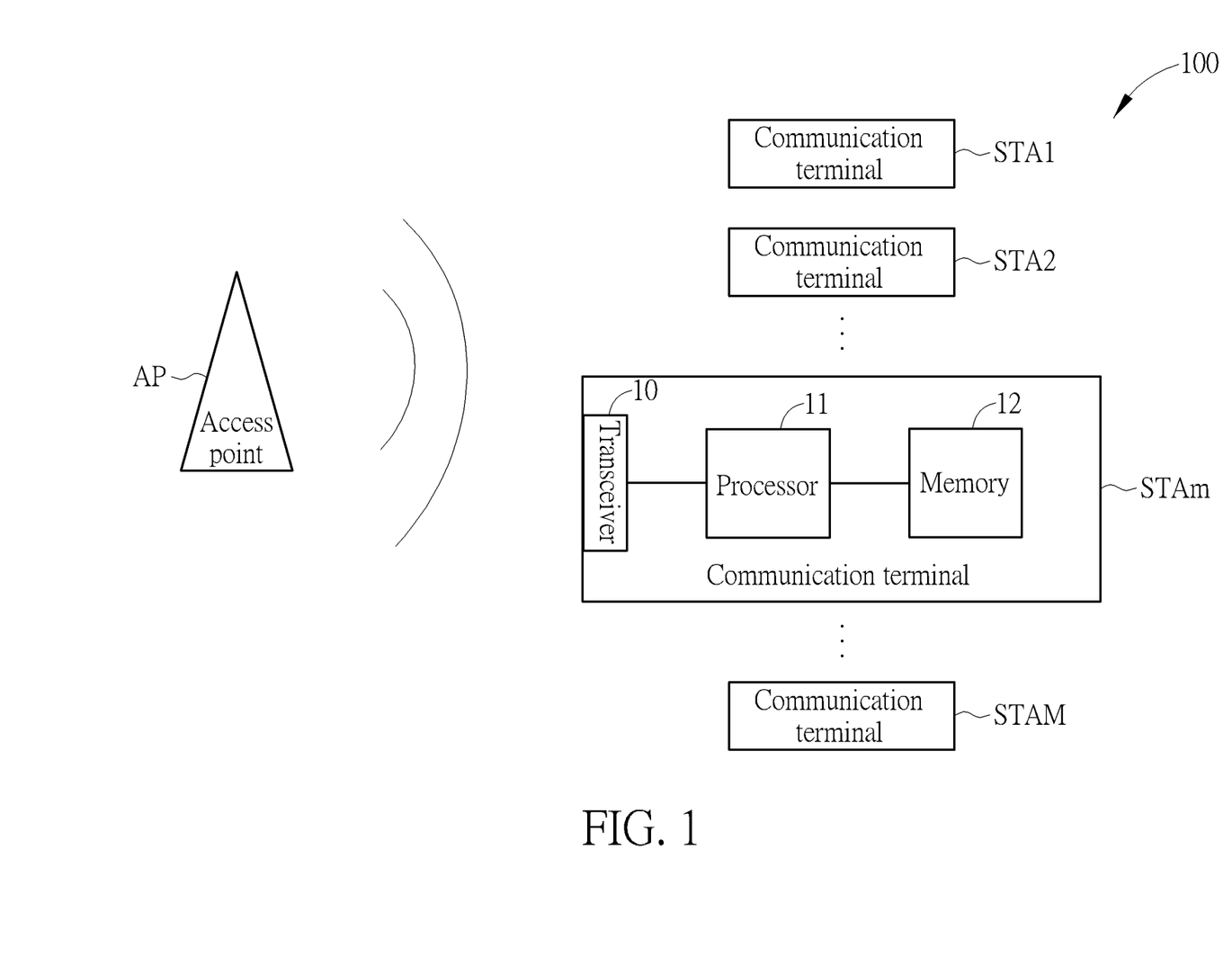
FIG. 1 is a block diagram of a resource allocation system according to an embodiment of the present disclosure.

FIG. 1 is a block diagram of a resource allocation system 100 according to an embodiment of the present disclosure. The resource allocation system 100 can be applied to Wi-Fi 6 communications based on the IEEE 802.11ax standard. However, applications of the resource allocation system 100 are not limited to Wi-Fi 6 communications. The resource allocation system 100 can be applied to any communication system capable of allocating multiple resources, such as spectrum band resources of at least one subcarrier in a multi-carrier system (MCS). The resource allocation system 100 can include an access point AP and M communication terminals, denoted as STA1 to STAM. M can be any positive integer greater than or equal to two. The access point AP can be a wireless access point capable of transmitting and receiving wireless signals. Communication terminals STA1 to STAM can be any user equipment node, such as a smartphone, a notebook, or a tablet. The communication terminals STA1 to STAM have capabilities of establishing wireless links to the access point AP. Therefore, the communication terminals STA1 to STAM may compete to acquire their access resources in a limited bandwidth provided by the access point AP. Each communication terminal may include a transceiver 10, a processor 11, and a memory 12. The transceiver 10 is used for communicating with the access point AP. The processor 11 is coupled to the transceiver 10 for analyzing a received signal (such as performing a demodulation process, a decoding process, or a data extracting process). The memory 12 is coupled to the processor 11 for buffering data.

In the resource allocation system 100, the access point AP can generate a trigger frame signal. For example, the trigger frame signal is a broadcasting signal generated by the access point AP in the 802.11ax standard. The access point AP can acquire all random access resource units in the multi-carrier system according to the IEEE802.11ax standard. Then, the access point AP can select at least one released random access resource unit for generating and broadcasting the trigger frame signal accordingly. Therefore, the communication terminals STA1 to STAM within a signal broadcasting coverage of the access point AP can receive the trigger frame signal. The processor 11 of the each communication terminal STA1 to STAM can analyze the trigger frame signal for continuously acquiring at least one user information field carried by the trigger frame signal during multiple time intervals. Further, the processor 11 can determine (or can detect) a random access resource unit number according to the user information field in each time interval. Here, the random access resource unit is an eligible random access resource unit. For example, the random access resource unit satisfies parameters such as a bandwidth, a transmission rate, and a signal power value in the IEEE 802.11ax standard. In some embodiments, the communication terminals STA1 to STAM are required to satisfy conditions (transmission rate, signal-to-noise ratio) configured by the access point AP.

Then, the processor 11 can decrease a countdown parameter to generate a countdown result according to the at least one random access resource unit number during at least one time interval. The processor 11 can determine whether to continuously receive the trigger frame signal according to the countdown result. Then, the processor 11 can select a random access resource unit from multiple random access resource units of the at least one user information field. Further, in the resource allocation system 100, the user information field of the trigger frame signal can include information of at least one random access resource unit. For example, the user information field may include frequency band resource information corresponding to at least one sub-carrier in the multi-carrier system. The communication terminals STA1 to STAM can probabilistically use at least one random access resource unit (such as performing a competitive process) for transmitting data through the access point AP. The resource allocation system 100 can only buffer a current user information field of the at least one user information field of the trigger frame signal. Since only one user information field is buffered, the resource allocation system 100 can be regarded as a system with low memory usage. Details of selecting and allocating the random access resource unit by the resource allocation system 100 are illustrated in the paragraphs below.

In some embodiments, when two or more communication terminals access the same random access resource unit, if these communication terminals fail to acquire a data access process, countdown parameters of these communication terminals are reset.

Figure 2:
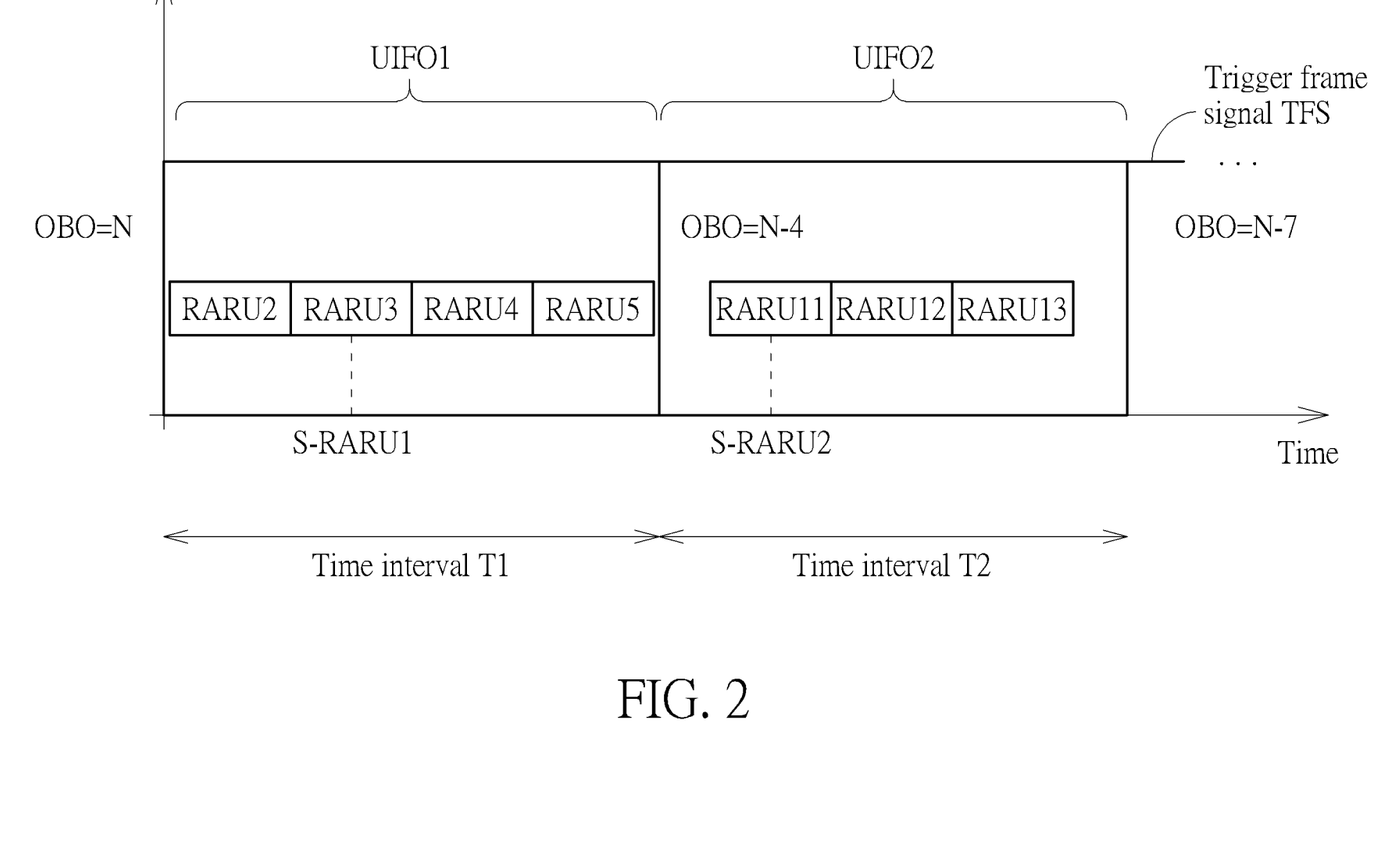
FIG. 2 is a schematic diagram of selecting a random access resource unit of a user information field according to a trigger frame signal in a first selection mode of the resource allocation system in FIG. 1.

FIG. 2 is a schematic diagram of selecting a random access resource unit of a user information field according to the trigger frame signal TFS in a first selection mode of the resource allocation system 100. In some embodiments, in the user information field, consecutive indices of random access resource units may not correspond to consecutive time intervals. FIG. 2 is only a special case for illustrating the countdown parameter. Any reasonable random access resource unit sequence falls into the scope of the present disclosure. For example, in the user information field UIFO1, random access resource units RARU2 and RARU3 may not correspond to consecutive time intervals.

First, the processor 11 of the communication terminal (e.g., the communication terminal STAm) can randomly generate an initial value N of the countdown parameter OBO. The initial value N of the countdown parameter OBO can be randomly generated according to an upper bound and a lower bound. The upper bound and the lower bound can be determined by the access point AP. For example, the lower bound can be set to zero. The upper bound can be set to an integer selected from 4 to 10. After the transceiver 10 receives the trigger frame signal TFS, the processor 11 can analyze the trigger frame signal TFS for acquiring the user information field UIFO1. Then, the processor 11 can further acquire Q1 random access resource units according to the user information field UIFO1. Here, Q1 is equal to 4. As shown in FIG. 2, the user information field UIFO1 includes a random access resource unit RARU2, a random access resource unit RARU3, a random access resource unit RARU4, and a random access resource unit RARU5. Then, the processor 11 can decrease the countdown parameter OBO according to the random access resource unit number of the user information field UIFO1 or according to at least one user information field. Then, the processor 11 can select a random access resource unit corresponding to the countdown parameter OBO decreased to zero (OBO=0) for accessing data, when the countdown parameter OBO is decreased to zero or less than zero. For example, the initial value N of the countdown parameter OBO is 2. After the countdown parameter OBO is decreased twice according to the user information field UIFO1 received by the transceiver 10, the countdown parameter OBO is reduced to zero during the time interval T1. In other words, after the user information field UIFO1 is received, since the user information field UIFO1 includes 4 random access resource units, the countdown parameter OBO "2" becomes "0" during the time interval T1 of the user information field UIFO1. Therefore, the processor 11 can select a random access resource unit RARU3 (which corresponds to the countdown parameter OBO decreased to 0) during the time interval T1 of the trigger frame signal TFS. In other words, the random access resource unit RARU3 can be regarded as a selected random access resource unit, denoted as S-RARU1. The selected random access resource unit S-RARU1 can be used for resource allocation.

In another embodiment, the initial value N of the countdown parameter OBO is 5. After the processor 11 decreases the countdown parameter OBO according to the random access resource unit number of the user information field UIFO1 (RARU2 to RARU5), the countdown parameter OBO becomes 5−4=1. After the time interval T1 elapses, the countdown parameter OBO is still a positive integer. Therefore, the processor 11 can continuously decrease the countdown parameter OBO according to the next user information field UIFO2. Further, the memory 12 can replace the buffered user information field UIFO1 with the user information field UIFO2. Then, the processor 11 continuously decreases the countdown parameter OBO according to the user information field UIFO2. After the time interval T2 elapses, the countdown parameter OBO becomes 1−3<0. Therefore, the processor 11 can select a random access resource unit RARU11 (corresponding to the countdown parameter OBO decreased to 0) during the time interval T2 of the trigger frame signal TFS. In other words, the random access resource unit RARU11 can be regarded as a selected random access resource unit, denoted as S-RARU2. The selected random access resource unit S-RARU2 can be used for resource allocation.

Similarly, when the initial value N of the countdown parameter OBO is large, the processor 11 can decrease the countdown parameter OBO from N to N−4 according to the 4 random access resource units corresponding to the user information field UIFO1. The processor 11 can further decrease the countdown parameter OBO from N−4 to N−7 according to the 3 random access resource units corresponding to the user information field UIFO2. Finally, the processor 11 can select the random access resource unit corresponding to the countdown parameter OBO decreased to 0. By doing so, since the resource allocation system 100 can use the memory 12 for merely buffering current user information field of the trigger frame signal to select the random access resource unit according to the countdown parameter OBO, the resource allocation system 100 can provide a real-time resource selection function without introducing high capacity memory hardware.

In some embodiments, the countdown parameter OBO with an initial value N equal to "0" and the countdown parameter OBO with an initial value N equal to "1" can correspond to the same "selected" random access resource unit. For example, the countdown parameter OBO with the initial value N equal to "0" and the countdown parameter OBO with the initial value N equal to "1" are configured. After the time interval T1 of the user information field UIFO1 elapses, the processor 11 decreases the countdown parameters OBO to 0−4<0 and 1−4<0 according to the random access resource unit number of the user information field UIFO1, and the selected random access resource units are both the random access resource unit RARU2.

In some embodiments, when a communication terminal (such as the communication terminal STAm) and another communication terminal (such as the communication terminal STA1) select the same random access resource unit (such as the random access resource unit RARU12) at the same time, these communication terminals may compete to acquire the selected random access resource unit. If the communication terminal STA1 successfully acquires the selected random access resource unit, the communication terminal STAm can regenerate a countdown parameter OBO. Then, the communication terminal STAm can select another random access resource unit according to the random access resource unit number of the trigger frame signal TFS and the regenerated countdown parameter OBO.

In some embodiments, when the communication terminal (such as the communication terminal STAm) and another communication terminal (such as the communication terminal STA1) select the same random access resource unit (such as the random access resource unit RARU12) at the same time, these communication terminals may fail to access or fail to acquire the selected random access resource unit. Then, all of these communication terminals may regenerate their countdown parameters OBO. Further, these communication terminals can select new random access resource units according to the random access resource unit number of the trigger frame signal TFS and their regenerated countdown parameters OBO.

In some embodiments, when the countdown parameter OBO is regenerated by the communication terminal, the upper bound of the countdown parameters OBO may be increased. For example, the upper bound of an original countdown parameter OBO is 4. After the communication terminals fail to access or fail to acquire the selected random access resource unit, the upper bound of their regenerated countdown parameters OBO can be set to 5. In other words, randomness of generating the countdown parameters OBO can be increased. Therefore, a risk of accessing the same random access resource unit by different communication terminals can be reduced.

In some embodiments, after the countdown parameter OBO is regenerated, the transceiver 10 can receive a next trigger frame signal TFS. After the next trigger frame signal TFS is received, the regenerated countdown parameter OBO can be decreased according to the next trigger frame signal TFS. For example, it is assumed that the user information fields UIFO1 and UIFO2 in FIG. 2 belong to different trigger frame signals TFS. An initial value of the countdown parameter OBO is 2. The processor 11 can select a random access resource unit RARU3. Then, when the processor 11 fails to access the random access resource unit RARU3, the processor 11 can regenerate a countdown parameter OBO equal to 3. Then, the processor 11 can decrease the regenerated countdown parameter OBO according to the user information field UIFO2 carried by the next trigger frame signal TFS. Finally, a random access resource unit RARU13 can be selected by the processor 11.

Figure 3:
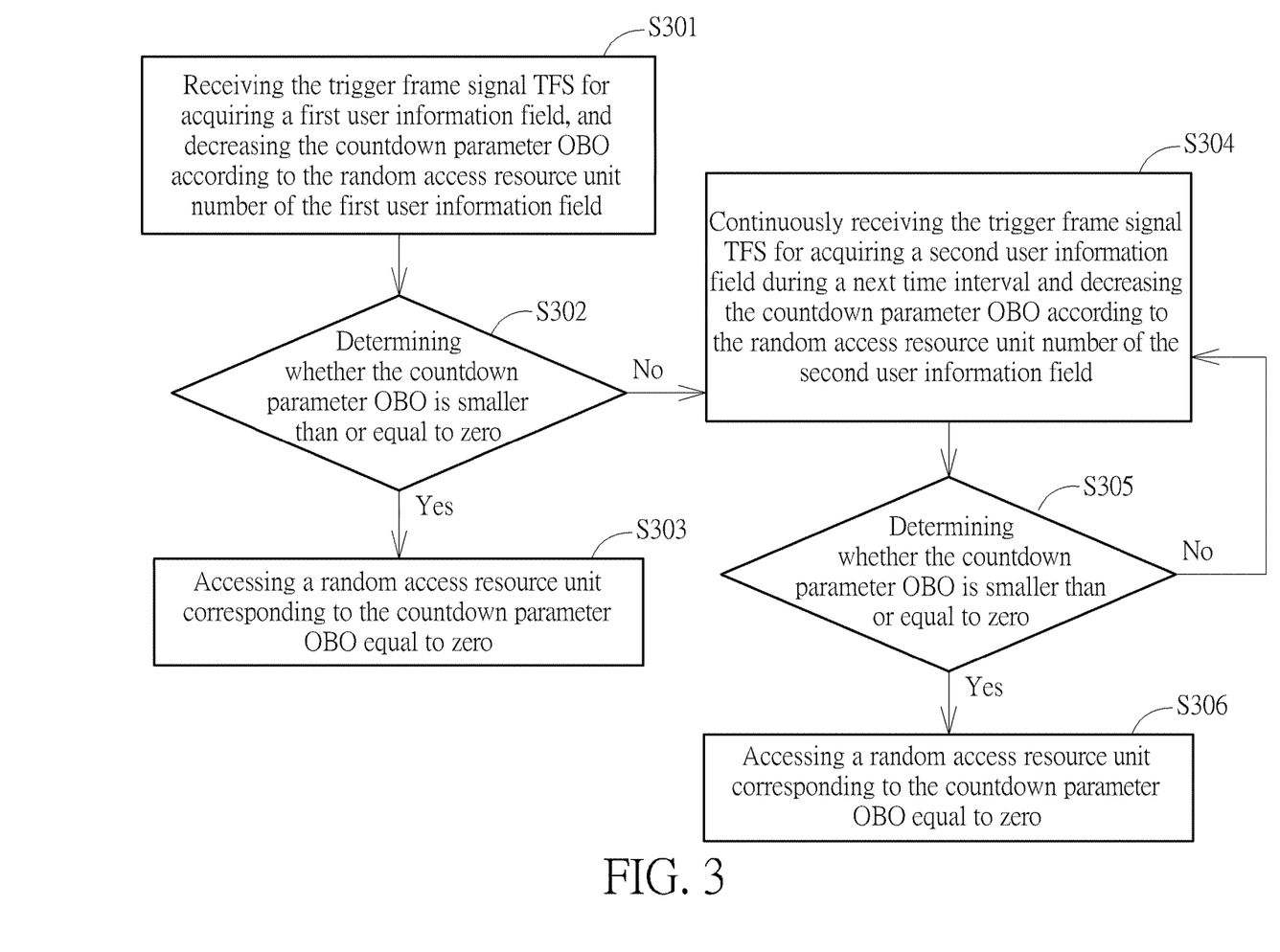
FIG. 3 is a flow diagram of the first selection mode in FIG. 2.

FIG. 3 is a flow diagram of performing the first selection mode by the resource allocation system 100 according to the user information field carried by the trigger frame signal TFS. The first selection mode includes step S301 to step S306. Step S301 to step S306 are illustrated below.

step S301: receiving the trigger frame signal TFS for acquiring a first user information field, and decreasing the countdown parameter OBO according to the random access resource unit number of the first user information field;

step S302: determining whether the countdown parameter OBO is smaller than or equal to zero; if yes, executing step S303; if not, executing step S304;

step S303: accessing a random access resource unit corresponding to the countdown parameter OBO equal to zero.

step S304: continuously receiving the trigger frame signal TFS for acquiring a second user information field during a next time interval and decreasing the countdown parameter OBO according to the random access resource unit number of the second user information field;

step S305: determining whether the countdown parameter OBO is smaller than or equal to zero; if yes, executing step S306; if not, executing step S304;

step S306: accessing a random access resource unit corresponding to the countdown parameter OBO equal to zero.

Details of step S301 to step S306 are illustrated in FIG. 2. Thus, they are omitted here. As previously mentioned, by using step S301 to step S306, the resource allocation system 100 can provide the real-time resource selection function without introducing the high capacity memory hardware. However, since the upper bound and the lower bound are determined by the access point AP, when the upper bound and the lower bound are two small values, only a small set of random access resource units can be selected. Thus, since a distribution of countdown parameters OBO is in the small set, the communication terminals STA1 to STAM may access random access resource units within the first few time intervals, leading to uneven resource allocation. Thus, an offset parameter can be introduced to the resource allocation system 100 such that the random access resource units can be more evenly acquired or accessed, which is illustrated below.

Figure 4:
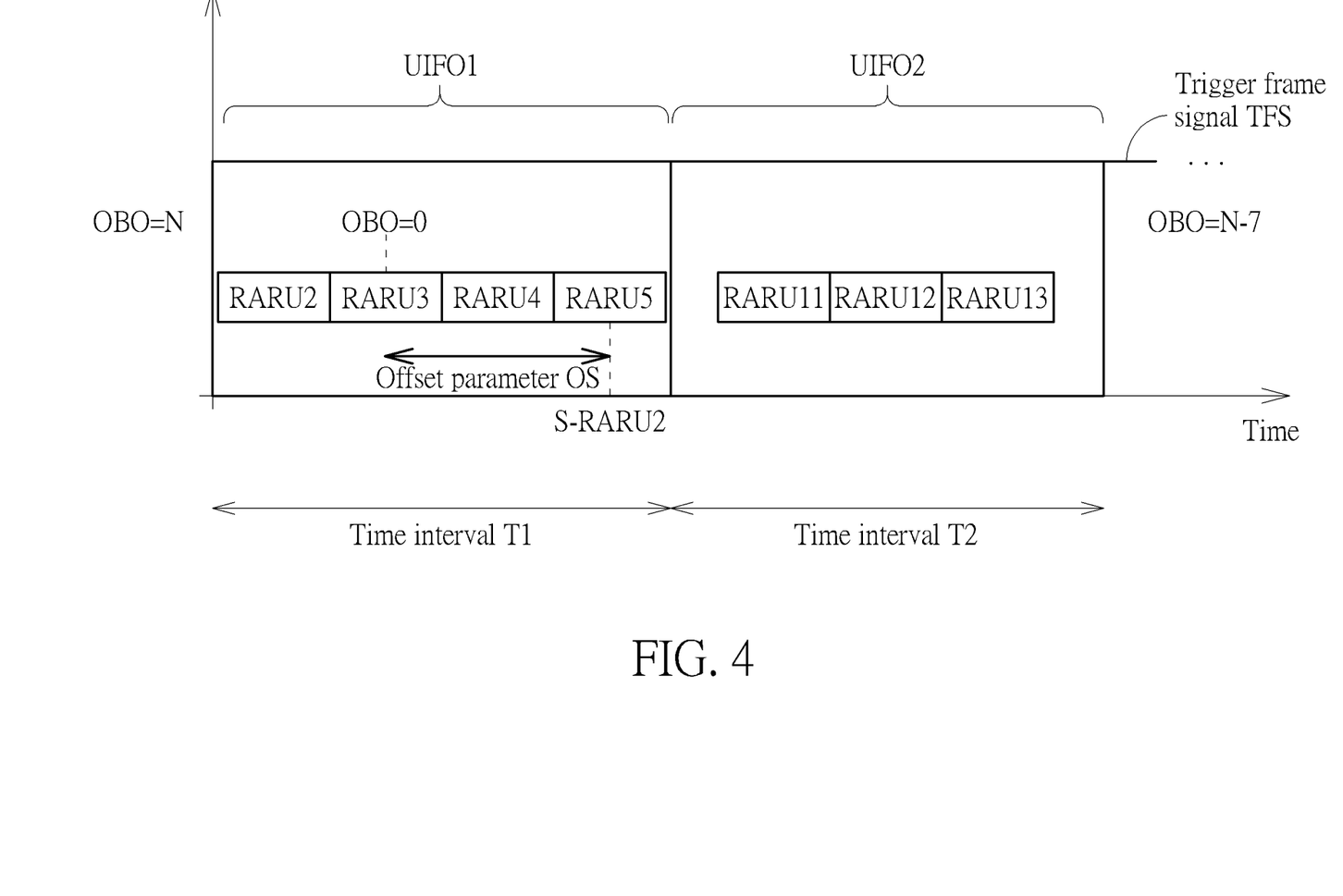
FIG. 4 is a schematic diagram of selecting a random access resource unit of a user information field according to the trigger frame signal in a second selection mode of the resource allocation system in FIG. 1.

FIG. 4 is a schematic diagram of selecting a random access resource unit of a user information field according to the trigger frame signal TFS in a second selection mode of the resource allocation system 100. First, the processor 11 of the communication terminal can randomly generate the initial value N of the countdown parameters OBO and can set the offset parameter OS. Here, the offset parameter OS can be generated by a random process or can be generated by a user-defined process. The offset parameter OS is a positive integer. After the transceiver 10 receives the trigger frame signal TFS during the time interval T1, the processor 11 can analyze the trigger frame signal TFS for acquiring the user information field UIFO1. Then, the processor 11 can further acquire Q1 random access resource units according to the user information field UIFO1. Further, the processor 11 can decrease the countdown parameter OBO according to the random access resource unit number of the user information field UIFO1. After the countdown parameter OBO is decreased, the processor 11 can acquire a random access resource unit flag corresponding to the countdown parameter OBO decreased to zero. Then, after the random access resource unit flag (e.g., RARU3) corresponding to the countdown parameter OBO decreased to zero is determined, the processor 11 can further decrease the offset parameter OS according to subsequent random access resource unit number following the random access resource unit flag. For example, the initial value N of the countdown parameter OBO is equal to 2. An initial value of the offset parameter OS is equal to 2. Then, the processor 11 can decrease the offset parameter OS (2) according to the subsequent random access resource unit number following the random access resource unit RARU3. Therefore, the processor 11 can acquire a random access resource unit RARU5 of the trigger frame signal TFS corresponding to the offset parameter OS decreased to zero. In other words, the random access resource unit RARU5 can be regarded as a selected random access resource unit, denoted as S-RARU2. In another embodiment, the initial value N of the countdown parameter OBO is equal to 2. An initial value of the offset parameter OS is equal to 3. The processor 11 can select a random access resource unit by shifting three random access resource units according to the random access resource unit RARU3 (i.e., the random access resource unit flag). Finally, the random access resource unit RARU 11 of the user information field UIFO2 can be selected by the processor 11. The selected random access resource unit can be used for resource allocation. By introducing the offset parameter OS, different random access resource units can be more evenly selected in the resource allocation system 100.

Figure 5:
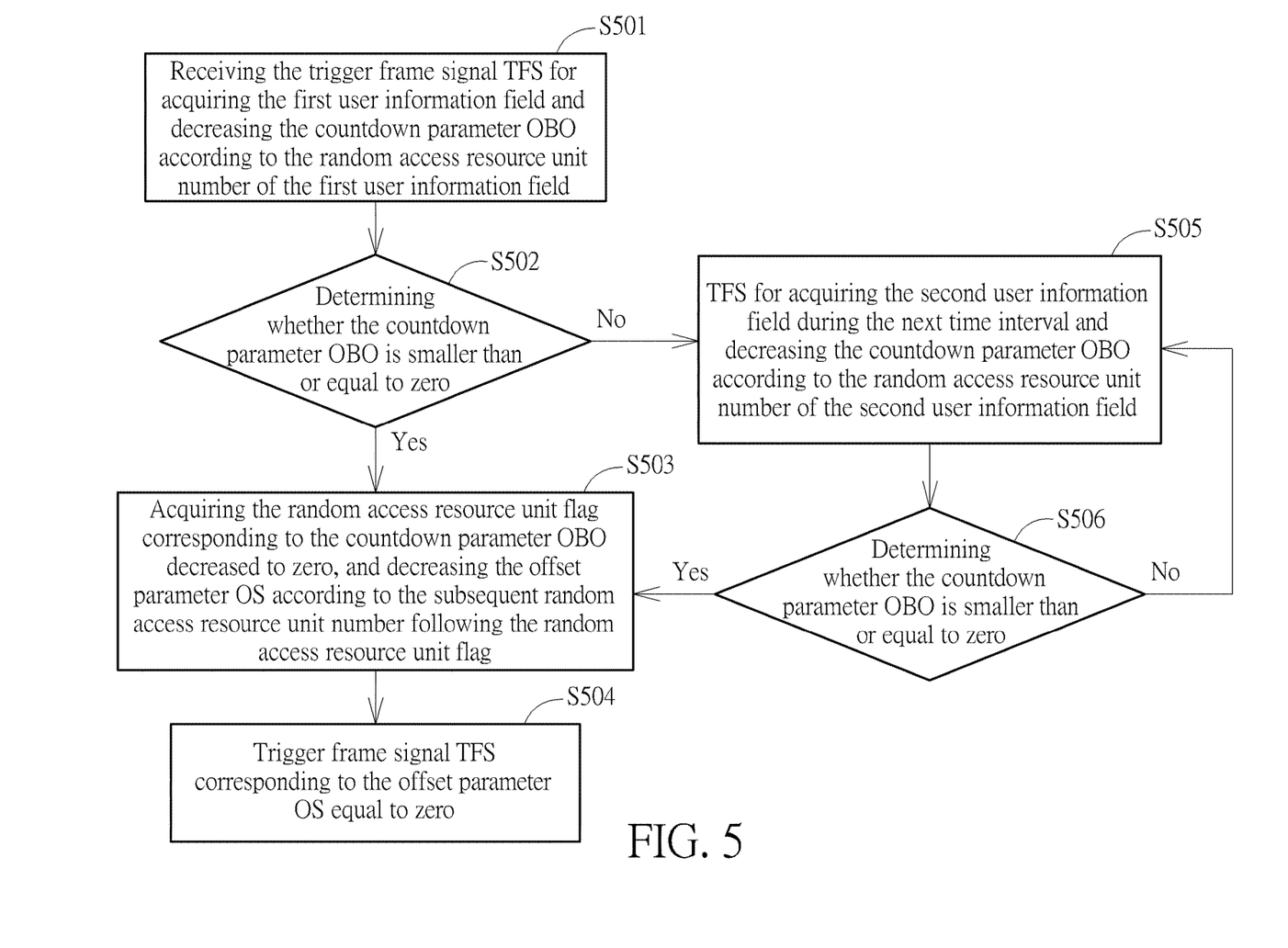
FIG. 5 is a flow diagram of the second selection mode in FIG. 4.

FIG. 5 is a flow diagram of performing the second selection mode by the resource allocation system 100 according to the user information field carried by the trigger frame signal TFS. The second selection mode includes step S501 to step S506. Step S501 to step S506 are illustrated below.

step S501: receiving the trigger frame signal TFS for acquiring the first user information field and decreasing the countdown parameter OBO according to the random access resource unit number of the first user information field;

step S502: determining whether the countdown parameter OBO is smaller than or equal to zero; if yes, executing step S503, if not, executing step S505;

step S503: acquiring the random access resource unit flag corresponding to the countdown parameter OBO decreased to zero, and decreasing the offset parameter OS according to the subsequent random access resource unit number following the random access resource unit flag;

step S504: accessing the random access resource unit of the trigger frame signal TFS corresponding to the offset parameter OS equal to zero.

step S505: continuously receiving the trigger frame signal TFS for acquiring the second user information field during the next time interval and decreasing the countdown parameter OBO according to the random access resource unit number of the second user information field;

step S506: determining whether the countdown parameter OBO is smaller than or equal to zero; if yes, executing step S503, if not, executing step S505.

Details of step S501 to step S506 are illustrated in FIG. 4. Thus, they are omitted here. As previously mentioned, by using step S501 to step S506, the resource allocation system 100 can provide the real-time resource selection function without introducing the high capacity memory hardware (memory 12). Further, even if the initial value N of the countdown parameter OBO is small, the offset parameter OS is capable of shifting a selection indicator of the random access resource units. Therefore, different random access resource units can be more evenly selected in the resource allocation system 100.

Figure 6:
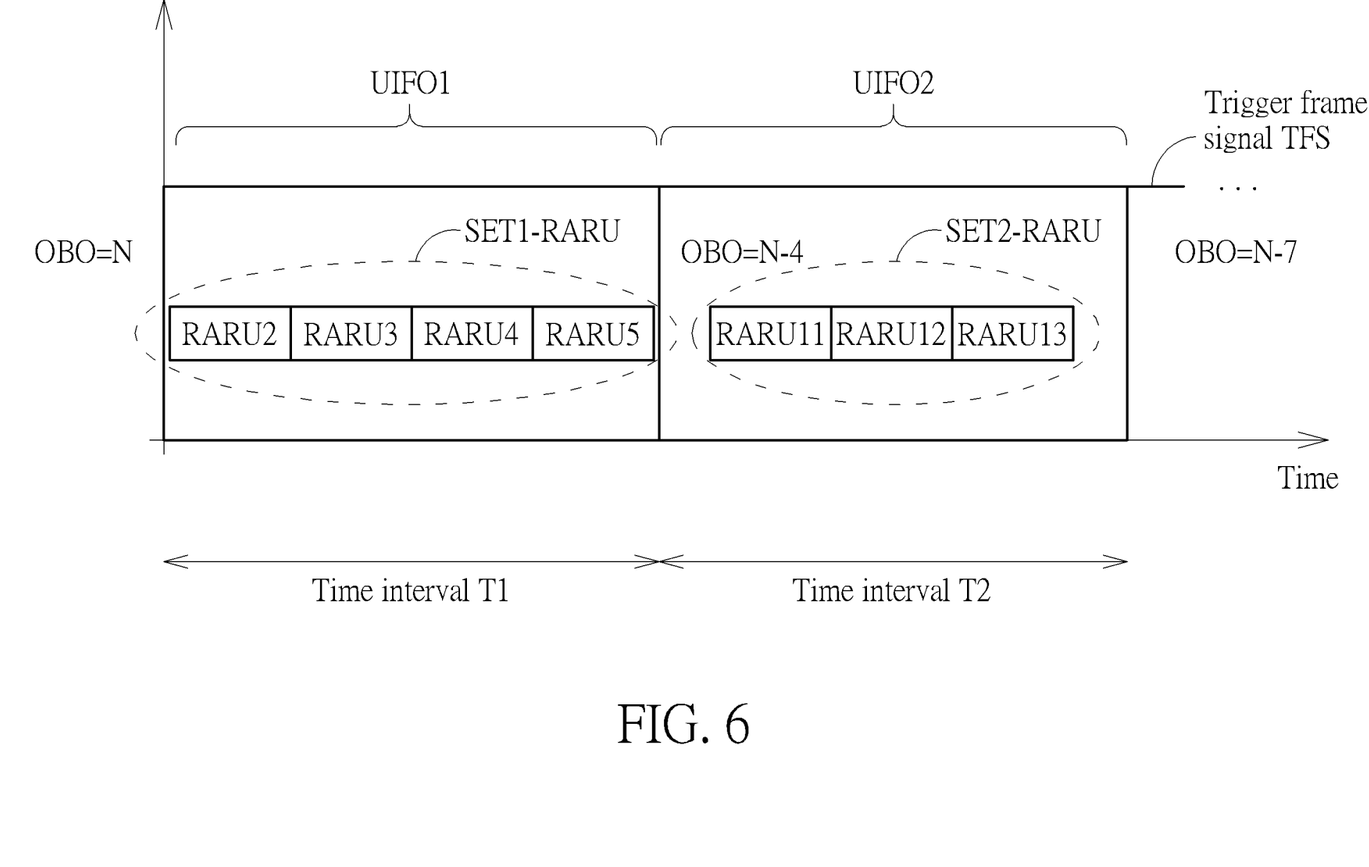
FIG. 6 is a schematic diagram of selecting a random access resource unit of a user information field according to the trigger frame signal in a third selection mode of the resource allocation system in FIG. 1.

FIG. 6 is a schematic diagram of selecting a random access resource unit of a user information field according to the trigger frame signal TFS in a third selection mode of the resource allocation system 100. First, the processor 11 of the communication terminal can randomly generate the initial value N of the countdown parameter OBO. After the transceiver 10 receives the trigger frame signal TFS during the time interval T1, the processor 11 can analyze the trigger frame signal TFS for acquiring the user information field UIFO1. Then, the processor 11 can further acquire Q1 random access resource units according to the user information field UIFO1. The processor 11 can decrease the countdown parameter OBO according to the random access resource unit number of the user information field UIFO1 or according to at least one user information field. After the countdown parameter OBO is decreased, the processor 11 can acquire a random access resource unit set of the trigger frame signal TFS corresponding to the countdown parameter OBO decreased to zero or less than zero. For example, the initial value N of the countdown parameter OBO is 2. Since the transceiver 10 receives 4 random access resource units of the user information field UIFO1 during the time interval T1, the countdown parameter OBO is reduced to zero during the time interval T1. Therefore, during the time interval T1, the processor 11 can select the random access resource unit set {RARU2, RARU3, RARU4, RARU5} of the user information field UIFO1, denoted as SET1-RARU. Further, the processor 11 can randomly select at least one random access resource unit from multiple random access resource units {RARU2, RARU3, RARU4, RARU5} of the random access resource unit set SET1-RARU of the user information field UIFO1 for resource allocation. In another embodiment, the initial value N of the countdown parameter OBO is 5. Since the transceiver 10 receives 4 random access resource units of the user information field UIFO1 during the time interval T1, the countdown parameter OBO is a non-negative integer (5−4=1) after the time interval T1 elapses. Therefore, the processor 11 can continuously receive at least one random access resource unit of the user information field UIFO2 during the time interval T2. Since the transceiver 10 receives 3 random access resource units of the user information field UIFO2 during the time interval T2, the countdown parameter OBO is reduced to zero during the time interval T2. Therefore, during the time interval T2, the processor 11 can select a random access resource unit set {RARU11, RARU12, RARU13} of the user information field UIFO2, denoted as SET2-RARU. The processor 11 can randomly select at least one random access resource unit from multiple random access resource units {RARU11, RARU12, RARU13} of the random access resource unit set SET2-RARU of the user information field UIFO2 for resource allocation. By doing so, the resource allocation system 100 can use the memory 12 for merely buffering one user information field of the trigger frame signal TFS during a time interval, and update the user information field of the trigger frame signal TFS during a next time interval. Therefore, the resource allocation system 100 can provide the real-time resource selection function without introducing the high capacity memory hardware.

Figure 7:
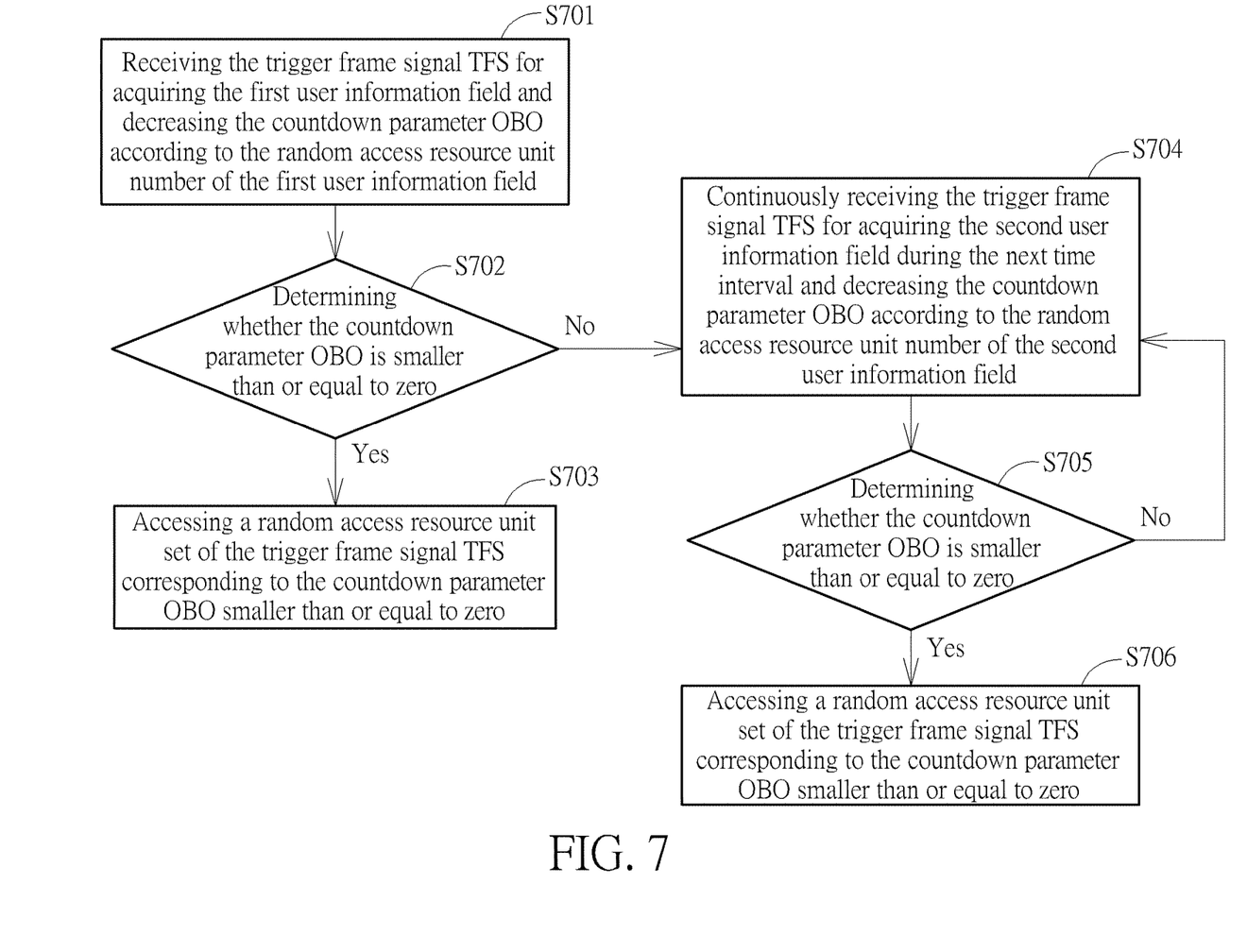
FIG. 7 is a flow diagram of the third selection mode in FIG. 6.

FIG. 7 is a flow diagram of performing the third selection mode by the resource allocation system 100 according to the random access resource unit set of the trigger frame signal TFS. The third selection mode includes step S701 to step S706. Step S701 to step S706 are illustrated below.

step S701: receiving the trigger frame signal TFS for acquiring the first user information field and decreasing the countdown parameter OBO according to the random access resource unit number of the first user information field;

step S702: determining whether the countdown parameter OBO is smaller than or equal to zero; if yes, executing step S703, if not, executing step S704;

step S703: accessing a random access resource unit set of the trigger frame signal TFS corresponding to the countdown parameter OBO smaller than or equal to zero.

step S704: continuously receiving the trigger frame signal TFS for acquiring the second user information field during the next time interval and decreasing the countdown parameter OBO according to the random access resource unit number of the second user information field;

step S705: determining whether the countdown parameter OBO is smaller than or equal to zero; if yes, executing step S706, if not, executing step S704;

step S706: accessing a random access resource unit set of the trigger frame signal TFS corresponding to the countdown parameter OBO smaller than or equal to zero.

Details of step S701 to step S706 are illustrated in FIG. 6. Thus, they are omitted here. As previously mentioned, by using step S701 to step S706, the resource allocation system 100 can provide the real-time resource selection function without introducing the high capacity memory hardware (memory 12). Similarly, the offset parameter can be introduced to the resource allocation system 100 for selecting random access resource units more evenly, as illustrated below.

Figure 8:
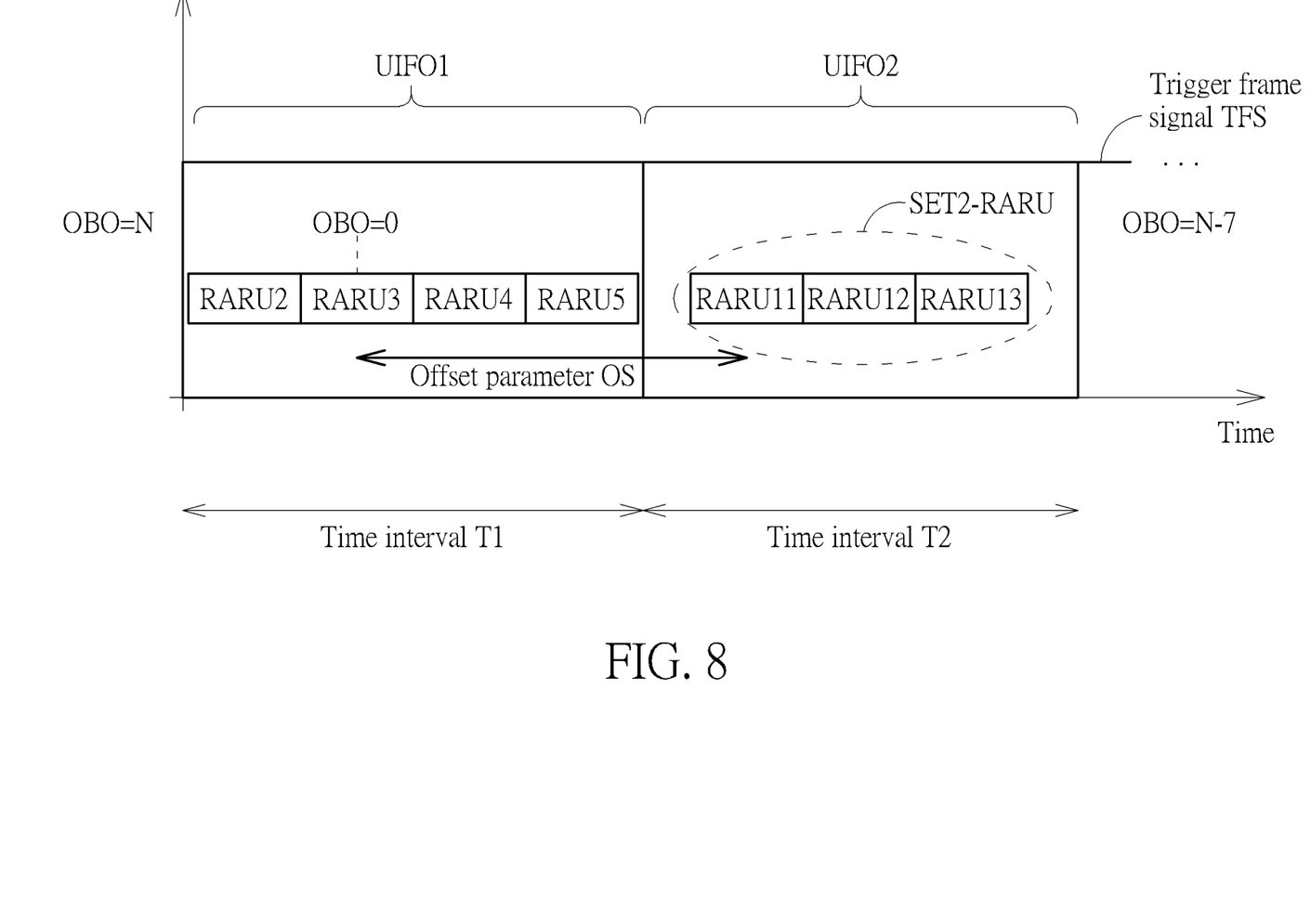
FIG. 8 is a schematic diagram of selecting a random access resource unit of a user information field according to the trigger frame signal in a fourth selection mode of the resource allocation system in FIG. 1.

FIG. 8 is a schematic diagram of selecting a random access resource unit of a user information field according to the trigger frame signal TFS in a fourth selection mode of the resource allocation system 100. First, the processor 11 of the communication terminal can randomly generate the initial value N of the countdown parameters OBO and can set the offset parameter OS. After the transceiver 10 receives the trigger frame signal TFS during the time interval T1, the processor 11 can analyze the trigger frame signal TFS for acquiring the user information field UIFO1. Then, the processor 11 can further acquire Q1 random access resource units according to the user information field UIFO1. Further, the processor 11 can decrease the countdown parameter OBO according to the random access resource unit number of the user information field UIFO1. After the countdown parameter OBO is decreased, the processor 11 can acquire the random access resource unit flag corresponding to the countdown parameter OBO decreased to zero. Then, after the random access resource unit flag (e.g., RARU3) corresponding to the countdown parameter OBO decreased to zero is determined, the processor 11 can decrease the offset parameter OS according to subsequent random access resource unit number following the random access resource unit flag. For example, the initial value N of the countdown parameters OBO is equal to 2. An initial value of the offset parameter OS is equal to 3. Then, the processor 11 can decrease the offset parameter OS (2) according to subsequent random access resource unit number following the random access resource unit RARU3. Therefore, the processor 11 can indicate a random access resource unit by shifting three random access resource units according to the random access resource unit RARU3 (i.e., the random access resource unit flag). The indicated random access resource unit falls into a random access resource unit set {RARU11, RARU12, RARU13} of the user information field UIFO2 during the time interval T2. The random access resource unit set {RARU11, RARU12, RARU13} of the user information field UIFO2 is denoted as SET2-RARU. The processor 11 can randomly select at least one random access resource unit from multiple random access resource units {RARU11, RARU12, RARU13} of the random access resource unit set SET2-RARU of the user information field UIFO2 for resource allocation. By introducing the offset parameter OS, random access resource units can be more evenly selected in the resource allocation system 100.

Figure 9:
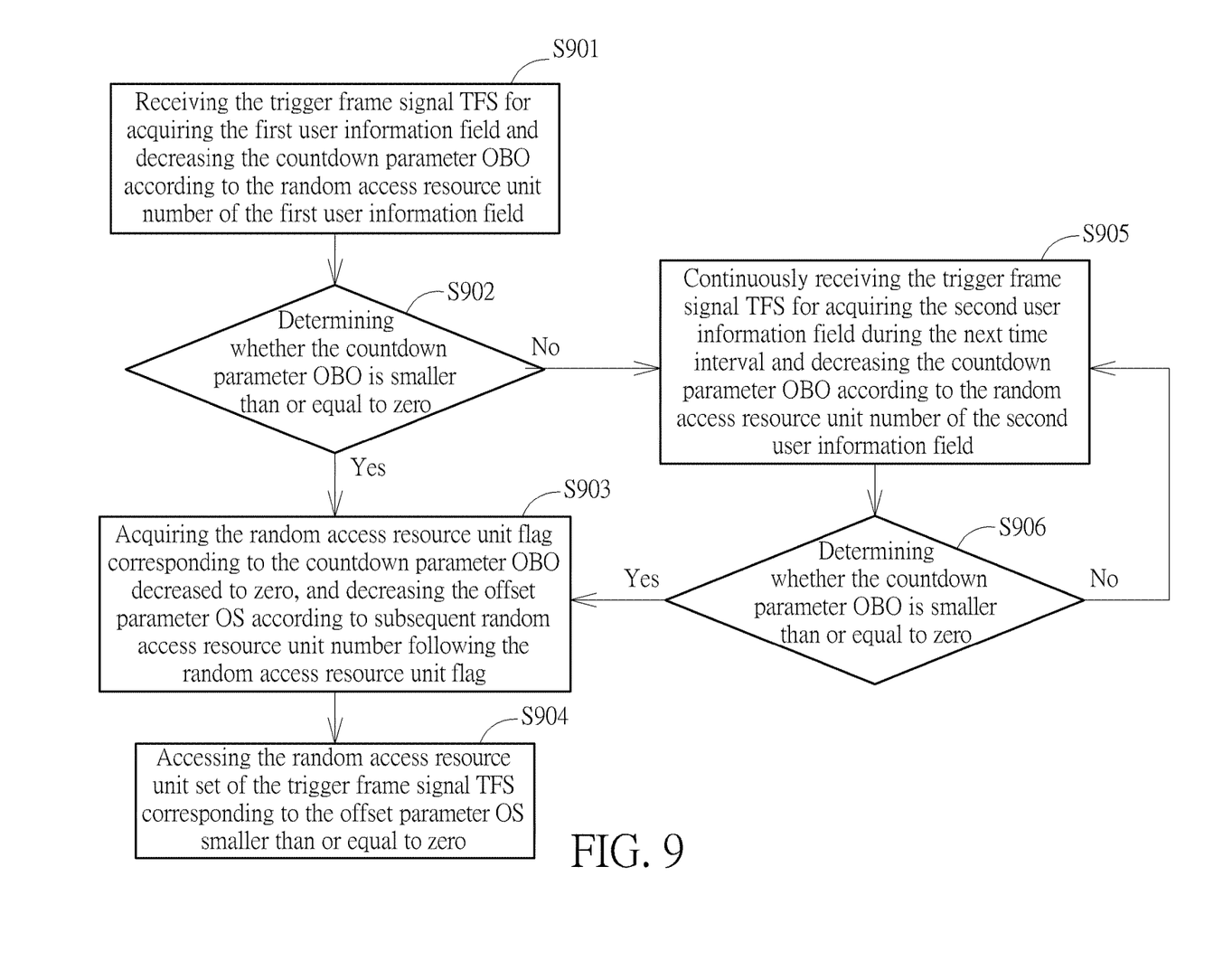
FIG. 9 is a flow diagram of the second selection mode in FIG. 8.

FIG. 9 is a flow diagram of performing the fourth selection mode by the resource allocation system 100 according to the random access resource unit set of the trigger frame signal TFS. The fourth selection mode includes step S901 to step S906. Step S901 to step S906 are illustrated below.

step S901: receiving the trigger frame signal TFS for acquiring the first user information field and decreasing the countdown parameter OBO according to the random access resource unit number of the first user information field;

step S902: determining whether the countdown parameter OBO is smaller than or equal to zero; if yes, executing step S903, if not, executing step S905;

step S903: acquiring the random access resource unit flag corresponding to the countdown parameter OBO decreased to zero, and decreasing the offset parameter OS according to subsequent random access resource unit number following the random access resource unit flag;

step S904: accessing the random access resource unit set of the trigger frame signal TFS corresponding to the offset parameter OS smaller than or equal to zero.

step S905: continuously receiving the trigger frame signal TFS for acquiring the second user information field during the next time interval and decreasing the countdown parameter OBO according to the random access resource unit number of the second user information field;

step S906: determining whether the countdown parameter OBO is smaller than or equal to zero; if yes, executing step S903, if not, executing step S905.

Details of step S901 to step S906 are illustrated in FIG. 8. Thus, they are omitted here. As previously mentioned, by using step S901 to step S906, the resource allocation system 100 can provide the real-time resource selection function without introducing the high capacity memory hardware. Even if the initial value N of the countdown parameter OBO is small, the offset parameter OS is capable of shifting a selection indicator of the random access resource units. Therefore, different random access resource units can be more evenly selected in the resource allocation system 100.

Figure 10:
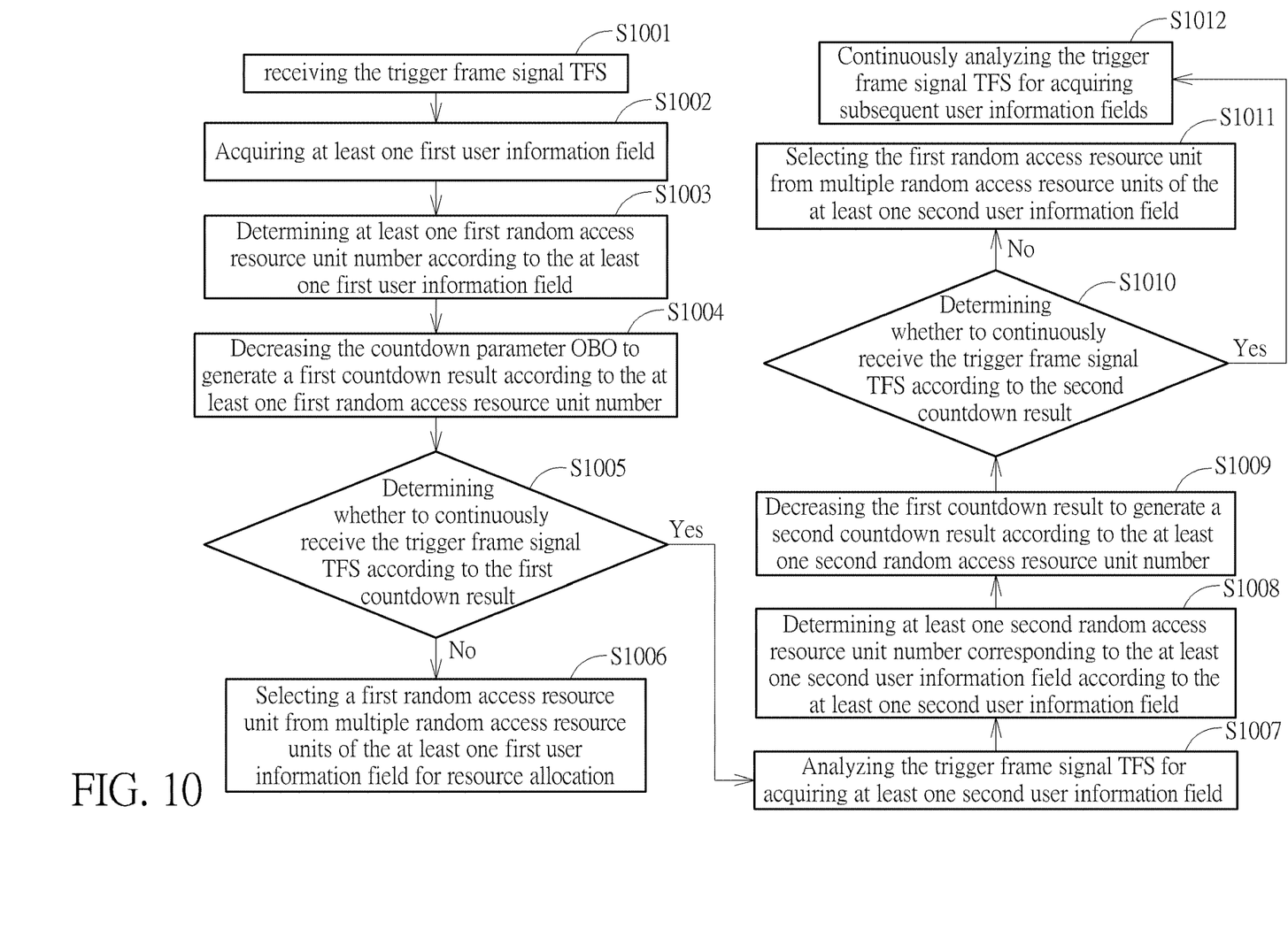
FIG. 10 is a flow diagram of a resource allocation method performed by the resource allocation system in FIG. 1.

FIG. 10 is a flow diagram of a resource allocation method performed by the resource allocation system 100. The flow chart in FIG. 10 can be regarded as generalized steps of the resource allocation method of the aforementioned embodiments. The resource allocation method includes step S1001 to step S1012, as illustrated below.

step S1001: receiving the trigger frame signal TFS;

step S1002: analyzing the trigger frame signal TFS for acquiring at least one first user information field;

step S1003: determining at least one first random access resource unit number according to the at least one first user information field;

step S1004: decreasing the countdown parameter OBO to generate a first countdown result according to the at least one first random access resource unit number;

step S1005: determining whether to continuously receive the trigger frame signal TFS according to the first countdown result; if yes, executing step S1007, if not, executing step S1006;

step S1006: selecting a first random access resource unit from multiple random access resource units of the at least one first user information field for resource allocation.

step S1007: analyzing the trigger frame signal TFS for acquiring at least one second user information field;

step S1008: determining at least one second random access resource unit number corresponding to the at least one second user information field according to the at least one second user information field;

step S1009: decreasing the first countdown result to generate a second countdown result according to the at least one second random access resource unit number;

step S1010: determining whether to continuously receive the trigger frame signal TFS according to the second countdown result, if yes, executing step S1012, if not, executing step S1011;

step S1011: selecting the first random access resource unit from multiple random access resource units of the at least one second user information field.

step S1012: continuously analyzing the trigger frame signal TFS for acquiring subsequent user information fields.

Details of step S1001 to step S1012 are previously illustrated. Thus, they are omitted here.

To sum up, the present disclosure illustrates a resource allocation method and a resource allocation system. The resource allocation method and the resource allocation system can introduce countdown parameters to multiple communication terminals for competing to access at least one random access resource unit provided by an access point. The resource allocation method and the resource allocation system can also introduce an offset parameter for selecting different random access resource units. Further, the resource allocation system can use a memory for merely buffering one user information field of a trigger frame signal during a time interval, and update the user information field of the trigger frame signal during a next time interval. A selected random access resource unit can be determined according to the countdown parameter. The selected random access resource unit can also be determined according to the countdown parameter and the offset parameter. Therefore, the resource allocation system can provide a real-time resource selection function without introducing high capacity memory hardware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A resource allocation method comprising:
setting an initial value of a countdown parameter;
setting an offset parameter;
receiving a trigger frame signal;
analyzing the trigger frame signal for acquiring at least one first user information field;
determining at least one first random access resource unit number according to the at least one first user information field;
decreasing the countdown parameter to generate a first countdown result according to the at least one first random access resource unit number;
acquiring a random access resource unit flag corresponding to the countdown parameter decreased to zero when the first countdown result is that the countdown parameter is decreased to zero or less than zero;
decreasing the offset parameter according to subsequent random access resource unit number following the random access resource unit flag; and
accessing a second random access resource unit corresponding to the offset parameter decreased to zero.

2. The method of claim 1, wherein the trigger frame signal is a Wi-Fi broadcasting signal of an access point in an IEEE 802.11ax standard, and the first random access resource unit of the random access resource units is an eligible random access resource unit.

3. The method of claim 1, wherein the first random access resource unit is a frequency band resource corresponding to at least one subcarrier in a multi-carrier system (MCS).

4. The method of claim 1, further comprising:
buffering only one of the at least one first user information field of the trigger frame signal during a time interval.

5. The method of claim 1, wherein the countdown parameter is a non-negative integer.

6. A resource allocation method comprising:
receiving a trigger frame signal;
setting an initial value of a countdown parameter;
setting an offset parameter;
analyzing the trigger frame signal for acquiring at least one first user information field;
determining at least one first random access resource unit number according to the at least one first user information field;
decreasing the countdown parameter to generate a first countdown result according to the at least one first random access resource unit number;
acquiring a random access resource unit flag corresponding to the countdown parameter decreased to zero;
decreasing the offset parameter according to subsequent random access resource unit number following the random access resource unit flag;
acquiring a second user information field corresponding to the offset parameter decreased to zero; and
randomly selecting a second random access resource unit from multiple random access resource units of the second user information field.

7. The method of claim 6,
wherein the trigger frame signal is a Wi-Fi broadcasting signal of an access point in an IEEE 802.11ax standard, and the first random access resource unit of the random access resource units is an eligible random access resource unit.

8. The method of claim 6,
wherein the first random access resource unit is a frequency band resource corresponding to at least one subcarrier in a multi-carrier system (MCS).

9. The method of claim 6,
further comprising:
buffering only one of the at least one first user information field of the trigger frame signal during a time interval.

10. The method of claim 6,
wherein the countdown parameter is a non-negative integer.

11. A resource allocation system comprising:
an access point configured to generate a trigger frame signal; and
at least one communication terminal linked to the access point, each communication terminal comprising:
a transceiver configured to receive the trigger frame signal;
a processor coupled to the transceiver and configured to analyze the trigger frame signal; and
a memory coupled to the processor;
wherein the processor sets an initial value of the countdown parameter and an offset parameter, after the trigger frame signal is analyzed by the processor, the processor acquires at least one first user information field, controls the memory to buffer data of one user information field, determines at least one first random access resource unit number, according to the at least one first user information field, and decreases a countdown parameter to generate a first countdown result according to the at least one first random access resource unit number, the processor acquires a random access resource unit flag corresponding to the countdown parameter decreased to zero when the first countdown result is that the countdown parameter is decreased to zero or less than zero, and the processor decreases the offset parameter according to subsequent random access resource unit number following the random access resource unit flag; and
wherein the processor accesses a second random access resource unit corresponding to the offset parameter decreased to zero, or the processor acquires a second user information field corresponding to the offset parameter decreased to zero and randomly selects the second random access resource unit from multiple random access resource units of the second user information field.

12. The system of claim 11, wherein the trigger frame signal is a Wi-Fi broadcasting signal of the access point in an IEEE 802.11ax standard, and the first random access resource unit of the random access resource units is an eligible random access resource unit.

13. The system of claim 11, wherein the first random access resource unit is a frequency band resource corresponding to at least one subcarrier in a multi-carrier system (MCS).

14. The system of claim 11, wherein the processor controls the memory to buffer only one of the at least one first user information field of the trigger frame signal during a time interval.

15. The system of claim 11, wherein the countdown parameter is a non-negative integer.

* * * * *